United States Patent [19]

Giertz et al.

[11] Patent Number: 4,651,520
[45] Date of Patent: Mar. 24, 1987

[54] POWER AND HEAT GENERATION FROM FUELS

[75] Inventors: Franz Giertz, Ratingen; Bernhard Bonn, Essen, both of Fed. Rep. of Germany

[73] Assignee: Bergwerksverband GmbH, Essen, Fed. Rep. of Germany

[21] Appl. No.: 559,418

[22] Filed: Dec. 7, 1983

Related U.S. Application Data

[63] Continuation of Ser. No. 524,463, Aug. 18, 1983, abandoned, which is a continuation of Ser. No. 241,744, Mar. 9, 1981, abandoned.

[30] Foreign Application Priority Data

Mar. 11, 1983 [DE] Fed. Rep. of Germany ....... 3009237

[51] Int. Cl.$^4$ ............................................. F02C 3/26
[52] U.S. Cl. ............................... 60/39.464; 60/39.182
[58] Field of Search ............ 60/39.02, 39.182, 39.464, 60/39.12, 39.17; 110/263, 244, 245; 431/7, 170; 122/4 D

[56] References Cited

U.S. PATENT DOCUMENTS

| | | | |
|---|---|---|---|
| 3,203,175 | 8/1965 | Michalicka et al. | 60/39.02 |
| 4,086,758 | 5/1978 | Harboe | 60/39.464 X |
| 4,164,846 | 8/1979 | Moskowitz et al. | 60/39.464 X |

Primary Examiner—Louis J. Casaregola
Assistant Examiner—Donald E. Stout
Attorney, Agent, or Firm—Michael J. Striker

[57] ABSTRACT

A method and apparatus for power and/or heat generation from fuels. The fuel is fed to a combustion chamber and a pressurized gaseous oxidizing agent is fed to the combustion chamber to fire the fuel in a fluidized bed. The smoke gases coming from the fluidized bed are cooled, purified in a purifier such as an electrostatic filter, reheated in a heat exchanger immersed into the fluidized bed and fed to the gas turbine. The exhaust gas from the gas turbine is fed to a recuperator for gaining the residual thermal energy and is then released through a chimney. The cooling of the smoke gas can be achieved by adding compressed air to the smoke gas stream or by introduction, e.g. into the upper half of the combustion chamber of a water or steam operated heat exchanger.

6 Claims, 2 Drawing Figures

POWER AND HEAT GENERATION FROM FUELS

This is a continuation of application Ser. No. 524,463, filed Aug. 18, 1983, now abandoned, which in turn is a continuation of application Ser. No. 241,744 filed Mar. 9, 1981, now abandoned.

BACKGROUND OF THE INVENTION

1. Field of the Invention

The present invention relates to a method and apparatus for generation of power and heat from fuels employing a pressurized fluidized bed reactor.

2. Brief Description of the Background of the Invention Including Prior Art

A generation of power and heat is generally provided by thermal power plants, which can be distinguished substantially by their combustion techniques. Initially, the technology of the power and heat generation has developed in this context from the grate firing, where coal is combusted in a fixed bed of to coal dust firing, where entrained coal is combusted. The fluidized bed combustion can be placed in between the two mentioned firing methods. A fluidized bed firing occurs when the gas velocity of the air stream directed from below at the bed material increases to such an extent that the packed bed initially transfers into a suspended state and with further increasing gas velocity transfers into a more or less turbulent motion.[X] The fluidized bed firing can be performed under atmospheric conditions or at elevated pressures. The pressurized fluidized bed firing has the advantage that the plants can be constructed as very compact units.

[X] The bed material in al fluidized bed combuster does not necessarily consist of the fuel alone, enstead, usually inert material like sand, limestone, ash etc. is used and the fuel, be it solid, liquid, or gaseous is dispersed in the bed material and tehn combusted with the fluidizing air stream.

There is presently very little known about the operation of fluidized bed firings under pressurized conditions in connection with a gas turbine plant. Pressure operated pilot plants are presently in the planning stage, are before the start-up operation or are on a trial basis.

It has been suggested that for power and heat generation from coal by way of a pressure operated fluidized bed firing the intake air is pressurized by a compressor of the gas turbine to the operating pressure and is then fed in two streams to the fluidized bed combustion chamber. One partial stream is directly fed to the fluidized bed as combustion air and the other partial stream is passed through a heat exchanger immersed into the fluidized bed firing. The combustion gas having a temperature of about 860° C. is purified in an electrostatic filter and is united with the hot air from the heat exchanger before entering the gas turbine. The heat remaining in the expanded gases is extracted via a waste-heat exchanger and the waste gases are then fed to a chimney (VGB Kraftwerkstechnik 59 (1979), copy 8, page 636, right column, last paragraph to page 637, left column, paragraph 1 and FIG. 7).

The purification of the hot gas is particularly difficult in these conventional processes. Available for this purpose are electrostatic precipitators, cyclones, bag house filters or granular bed filters and in all types of dust deposition apparatus the high temperature of the smoke gas of about 860° C. is an aggravating factor.[XX]

[XX] The term smoke gas is used here throughout to refer to the gaseous combustion products. It is not intended to indicate that theses gases necessarily contain achially smoke, fume or soot etc.

In addition, in the known processes the hot gases have to be conducted through corresponding hot gas pipes to the individual aggregates of the gas turbine plant with a pressure operated fluidized bed firing. For this purpose expensive installations of tubing conduits are required manufactured either from high-alloy Cr-Ni-steels or with a refractory lining and inner tube or through air cooled double jacket tubes, if the smoke gases of temperatures of about 860° C. are to be passed through.

SUMMARY OF THE INVENTION

1. Purposes of the Invention

It is an object of the present invention to improve the gas turbine process with pressure operated fluidized bed in the area of dedusting of smoke gases and in the area of pipe conduit construction.

It is another object of the present invention to modify the smoke gas before entering the purifier as to be less corrosive and aggressive versus the purifyer.

It is another object of the present invention to provide smoke gas sufficiently dedusted and at defined temperature to the gas turbine.

These and other objects and advantages of the present invention will become evident from the description which follows.

2. Brief Description of the Invention

The present invention provides a method for power and/or heat generation from fuels which comprises feeding the fuel to a combustion chamber, pressurizing a gaseous oxidizing agent, feeding the pressurized gaseous oxidizing agent to the combustion chamber, combusting the fuel in a fluidized bed in the combustion chamber with the pressurized gaseous oxidizing agent, cooling the smoke gases coming from the fuidized bed, purifying the smoke gases, reheating the smoke gases and feeding the smoke gases to a gas turbine. A preferred gaseous oxidizing agent is air.

The temperature of the reheated smoke gas can be from about 600° C. to 950° C. and preferably from about 680° C. to 870° C. The smoke gas coming from the fluidized bed can be cooled by adding compressed air and preferably air is pressurized both as a gaseous oxidizing agent and as a cooling additive and then distributed as desired. Also, the smoke gas can be cooled by heat exchange and the heat exchange fluid can be a member of the group consisting of water, steam, air, smoke gas and mixtures thereof. The smoke gas can be cooled at least in part directly after the combustion without prior acceleration and deceleration of the smoke gas stream. Heat can be removed from the fluidized bed during combustion with a heat exchanger immersed in the fluidized bed. The heat exchanger fluid can be a member of the group consisting of water, steam, air, purified smoke gas to be heated and mixtures thereof. Part of the purified smoke gas can be split off and the split off part can be fed to provide additional cooling to the smoke gas coming from the fluidized bed. The smoke gas can be cooled to temperature of from about 400° C. to 600° C. and preferably to temperatures from about 440° C. to 500° C. The hot smoke gas stream can be employed to produce steam via heat exchange and the steam produced can be employed for driving a steam turbine. The exhaust smoke gas from the gas turbine can be fed to a recuperator and the smoke gas coming from the recuperator can be vented through a chimney.

There is also provided an apparatus for power and/or heat generation from fuels comprising a compressor connected to a source of gaseous oxidizing agent, a combustion chamber having a fluid bed with fuel being combusted and the chamber is connected to a source of fuel and to the compressor, an outlet of the combustion chamber for removing the smoke gas, cooling means for the smoke gas connected to the combustion chamber and/or to the outlet of the combustion chamber, purifying means for the smoke gas and connected to the cooling means, a heat exchanger connected to the cooling means and disposed in the combustion chamber for reheating the smoke gas coming from the purifying means, and gas turbine connected to the heat exchanger.

A recuperator can be connected to the gas turbine and a smoke stack can be connected to the recuperator for removing the waste smoke gas. The cooling means can be provided by a feed adding a member of the group consisting of compressed air, compressed waste gas, steam, compressed air from the compressor through a pipe connection, purified smoke gas coming from the purifying means through a pipe connection and assortments thereof. The cooling means can also be provided by a heat exchanger. The purifying means can comprise an electrostatic purifier, a cyclone, a bag house filter, a granular bed filter, baffles and/or scrubbers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawings in which are shown two of the various possible embodiments of the present invention

DETAILED DESCRIPTION OF INVENTION AND PREFERRED EMBODIMENTS

Figure 1:
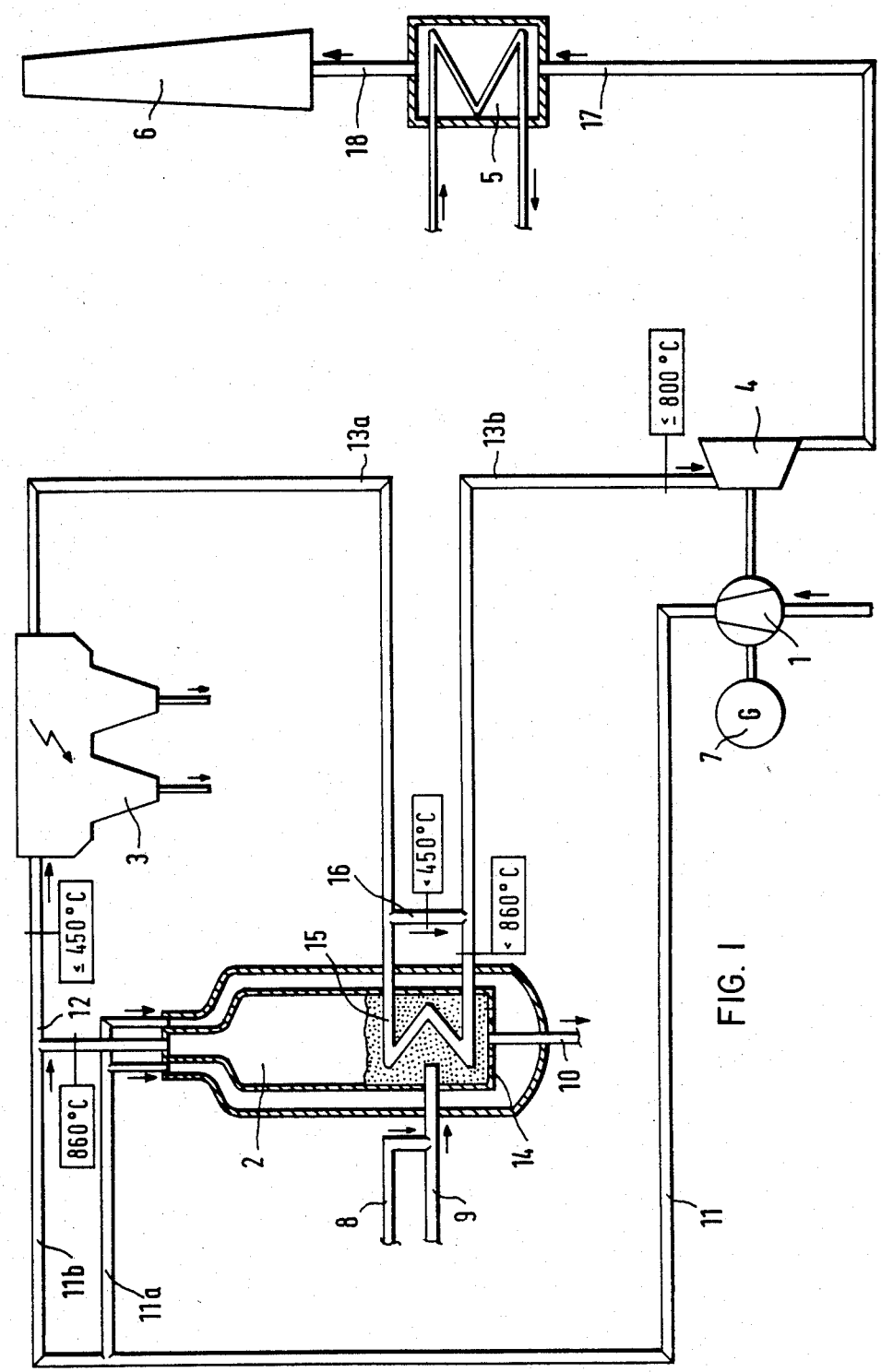
FIG. 1 shows a schematic diagram of a coal fired gas turbine plant employing compressed air as a cooling means for the smoke gas.

In accordance with the present invention there is provided a method for power and heat generation from fuels by way of a pressure operated fluidized bed firing wherein the hot smoke gases are dedusted, are then fed to a gas turbine connected to a generator and are thereafter fed to a waste heat boiler. Air is compressed in a compressor, compressed air is fed to a fluidized bed as combustion and fluidizing air, the hot smoke gas stream coming from the fluidized bed is cooled and then purified and then fed back to a heat exchanger situated in the combustion chamber for reheating to the temperature of the smoke gas and is finally fed to a gas turbine. Part of the compressed air can be split off before the combustion chamber and can be added to the hot smoke gas stream coming from the fluidized bed for cooling the same. Also, the hot smoke gas stream can be cooled by a water or steam cooled heat exchanger before being fed to the purifier and preferably the heat exchanger is operated in the same pressure container as the combustion chamber. The fluidized bed can be cooled with a heat exchanger immersed into it, which heat exchanger may employ water or steam as a heat exchanging fluid. A part of the purified smoke gas can in partial load operation be split off before reaching the heat exchanger and can be fed for being admixed to the reheated smoke gas stream. The smoke gases coming from the fluidized bed can have temperatures of about 860° C. and they can be cooled to about 450° C. The gas turbine process can be expanded with a steam turbine process to a combined cycle process.

Thus the present invention achieves the desired purpose by feeding air compressed in a compressor in part to a fluidized bed as combustion air and in part to the hot stream of smoke gas as cooling air. The thereby cooled smoke gas is fed back to a heat exchanger disposed in the fluidized bed and thereby again heated e.g. to the smoke gas temperature and is finally fed to the gas turbine. The present invention thus provides to shift the smoke gas dedusting and the largest part of the pipes required to the region of lower operation temperatures.

In one aspect of the invention upon partial operation of the gas turbine plant a partial stream of the cooled smoke gas is branched off in front of the heat exchanger and is after the heat exchanger again admixed to the reheated partial stream of the smoke gases. In accordance with the invention it is desirable when the smoke gases of about 860° C. are cooled by the added air to about 450° C. In addition the gas turbine process can be expanded to a combined cycle process by employing a steam turbine.

The present invention provides the advantages that the dedusting of the smoke gas can be performed at a lower temperature such as for example 450° C. At such temperature the electrostatic precipitators and filters are completely operable. In addition at such temperatures even the use of bag house filters is possible. Furthermore the piping of the plant is in a temperature region which is covered with conventional materials, with the exception of a short tube piece between the heat exchanger output and the gas turbine input. In addition, the armatures can be simplified based on the lowering of the operating temperature from about 860° C. to 450° C. This also affects the control of the plant.

In addition, the cooling of the hot stream of smoke gas can be performed by heat exchange with a water or steam operated heat exchanger. Such a heat exchanger is preferably disposed in the same pressure container as the combustion chamber and preferably in the gas volume above the fluidized bed. This embodiment provides the advantages that much less air has to be compressed, that much less smoke gas has to be reheated again, that with such a plant a smaller gas turbine is sufficient and that the ratio of the power provided by steam turbines versus gas turbines is increased. In this embodiment the cooling effect of the dedusted and cooled smoke gas is less in the immersed heat exchanger based on the smaller amount of waste gas. Then it is advantageous to incorporate in the fluidized bed a water and/or steam cooled heat exchanger. This embodiment can also be added to the embodiment employing air cooling. This embodiment is advantageous when operating with water/steam cooling and certain temperatures have to be maintained. The advantages of this embodiment include that the cooling of the fluidized bed is effected only in part and generally lesser part by the dedusted smoke gas and otherwise and mostly by additional water and/or steam cooled cooling surfaces. Since the gas cooled surfaces have nearly the temperature of the hot fluidized bed, in this case very expensive special materials are required for high temperatures. On the other hand cooling surfaces of steam and/or water fed heat exchangers such as for example of an evaporator do by far not reach the temperatures of the fluidized bed but only for example about 400° C. and it is therefore possible to use regular boiler steel. Thus there is provided a not insignificant saving in the capital costs of such a plant. It is preferred in smaller plants to add air for cooling purposes and it is preferred for larger plants to cool with heat exchangers.

Referring now to FIG. 1 there is shown coal fed through pipe 9 and limestone fed through line 8 to a pressurized fluidized bed combustion chamber 2. The coal is combusted in the combustion chamber at a temperature of about 860° C. The addition of limestone binds the sulfur released from the coal and is removed together with the ashes through pipe 10 via gates.

The fluidizing air required for the combustion is pressurized by the compressor 1 to a suitable operation pressure and then via the pipes 11 and 11a fed through the double jacket to the air distributing grid 14 of the pressurized fluidized bed combustion chamber 2 and the gas then streams upwards within the fluidized bed. The smoke gas cooling air is split off from the main air stream and is fed through the line 11b into the smoke gas stream of the pipe 12. This way the smoke gas stream is cooled from about 860° C. to about 450° C. The smoke gas is then purified at this temperature in an electrostatic precipitator or other dust remover 3 and is fed via pipe 13a to a heat exchanger 15 immersed in the fluidized bed, where the smoke gas is reheated to a temperature of about 860° C. In order to be able to run the gas turbine with partial load, part of the smoke gas can be split off via line 16 before entering the reheat heat exchanger 15 and can then be added to the reheated gases again in the line 13b in front of the gas turbine as cooling air. The gas expands in the gas turbine 4, which drives the compressor 1 and the generator 7. The expanded gases pass through line 17 to a recuperator or wasteheat heat exchanger 5 for extracting their heat and the pass via line 18 to the stack 6.

Figure 2:
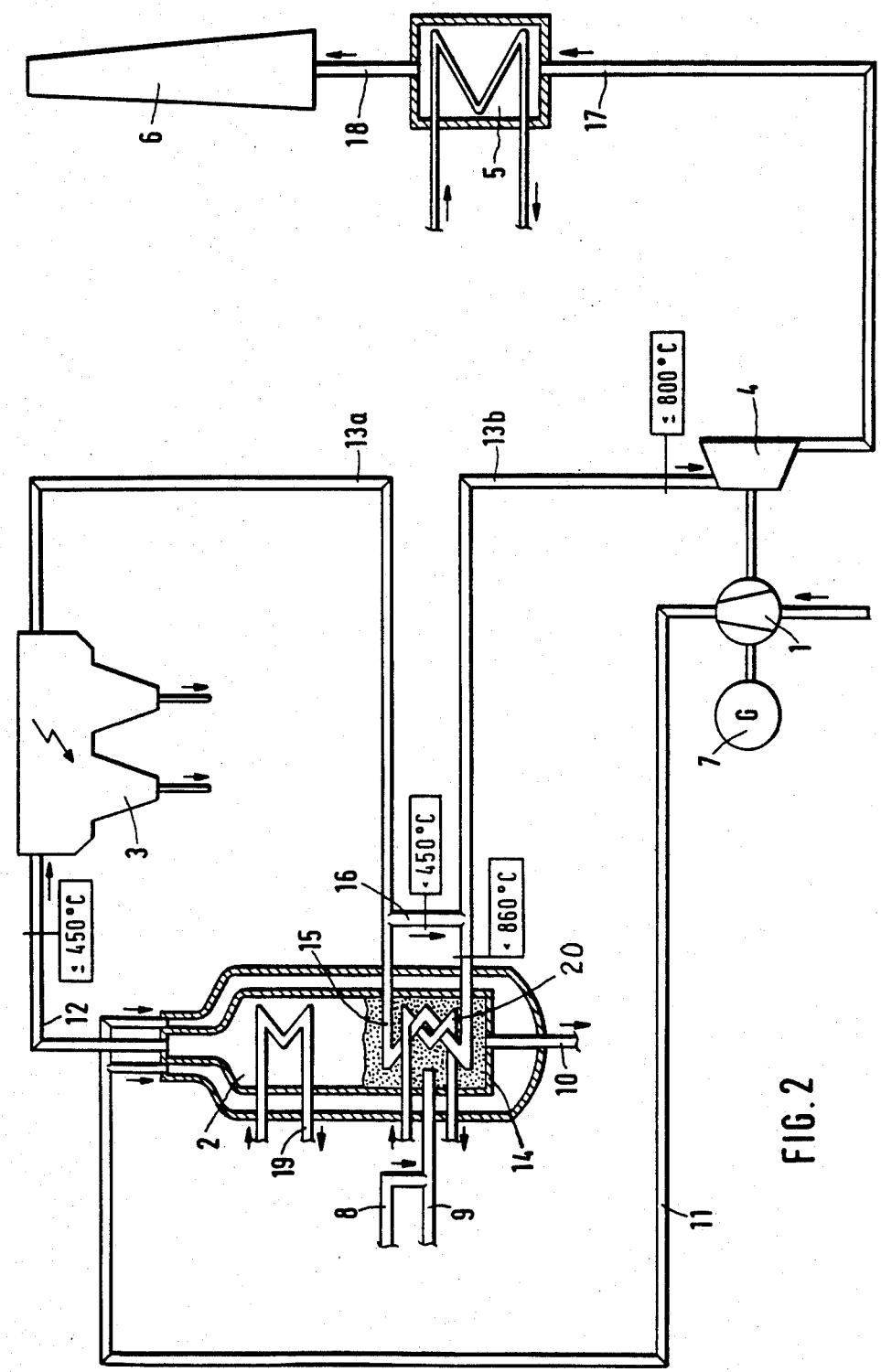
FIG. 2 shows a schematic diagram of a coal fired gas turbine plant employing a heat exchanger as a cooling means for the smoke gas.

Referring to FIG. 2 there is substantial correspondence to FIG. 1 and similar parts are designated with the same numerals. There is no compressed air pipe 11b in the embodiment of FIG. 2. However a water or steam cooled heat exchanger 19 is provided as well as a water or steam cooled heat exchanger 20 is immersed in the fluidized bed. In case it is desired to operate a combined gas/steam turbine cycle the water is e.g. preheated in the heat exchanger 5, it is turned into steam e.g. in the heat exchanger 20 and it is e.g. superheated in the heat exchanger 19.

EXAMPLE 1

About 1 kg hard coal equivalent (hce)/s of coal is fed to the combustion chamber 2 of FIG. 1 corresponding to a thermal power of 29.4 MW. 1 kg hce is the heat content of 1 kg of hard coal. The heat of compressing generated in the compressor 1 brings the air stream in pipe 11 to a temperature of about 230° C. The losses in the combustion chamber of heat assumed to be are about 3 MW. About 13 kg air per second is fed to the fluidized bed for burning the provided coal (pipe 11a). This amount is with appropriate construction of the combustion chamber cross-section also sufficient to fluidize the bed. Based on the adding of combustion products a smoke gas stream of about 13.7 kg/s with a temperature of about 860° C. leaves the combustion chamber. An amount of cooling air of 26.3 kg/s is added to the smoke gas via line 11b for cooling such that in pipe 12 a mass stream of about 40 kg/s with a temperature of about 450° C. is present, which after dedusting in the purifier 3 is fed to the heat exchanger 15 via line 13a. For heating to about 820° C. of this gas amount a heat quantity of about 16.3 MW is withdrawn from the combustion chamber, which corresponds to about 55 percent of the total thermal power of the combustion chamber. The remaining thermal power is distributed to the heat carried with the smoke gas and to radiation and respectively cooling losses of the combustion chamber. The reheated gas stream is fed via line 13b to the gas turbine 4 and by expansion with concurrent work generated the gas cools down. The generator 7 has an electrical power of about 5.5 MW and the waste gas enters the heat exchanger 5 at a temperature of about 450° C. and still provides there a thermal power of about 11 MW and is thereafter released with a temperature of about 180° C. to 200° C. to the stack 6.

EXAMPLE 2

This example refers to a power plant corresponding to FIG. 2. The coal throughput is again 1 kg hce/s corresponding to a thermal power of 29.4 MW. The air of about 13 kg/s required for combustion is provided by the gas turbine compressor and fed to the combustion chamber. The pressurized air serves as an oxidizing agent for the coal and serves to fluidize the bed material. The smoke gas of about 13.7 kg/s is cooled to about 400° C. by the water or steam fed heat exchanger and thereby about 7.1 MW thermal power are transferred to the cooling fluid. The cooled down smoke gas is dedusted and then reheated in the immersed heat exchanger to about 820° C. while picking up about 6.5 MW of thermal energy and is then fed to the gas turbine 4. In the gas turbine the smoke gas provides work and is expanded. It cools thereby to for example about 480° C. down and releases in the heat exchanger 5 about 3.4 MW thermal energy before it is removed having a temperature of about 160° C. through the chimney.

In this distribution of the mass streams there remains the combustion chamber excess power, which can be removed with an additional immersed water or steam operated heat exchanger. Assuming losses of 3 MW through radiation and heat conduction this additional amount results in about 8.9 MW. This way for example there results a ratio of steam turbine power versus gas turbine power of about 6:1.

It will be understood that each of the elements described above, or two or more together, may also find a useful application in other types of system configurations and power generating methods differing from the types described above.

While the invention has been illustrated and described as embodied in the context of a gas turbine power plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for power and/or heat generation from fuels comprising
   a source of fuel;
   a source of a gaseous oxidizing agent;
   a compressor connected to the source of gaseous oxidizing agent;
   a combustion chamber having a fluidized bed with fuel being combusted and connected to the source of fuel and to the compressor;
   an outlet of the combustion chamber for removing the smoke gas at a predetermined temperature;
   a first heat exchanger for cooling the smoke gas directly after the combustion without prior acceleration or deceleration of the smoke gas stream to a temperature substantially of 400° C.–600° C. within the combustion chamber;
   purifying means for purifying the smoke gas and connected to the first heat exchanger;
   a second heat exchanger connected to the purifying means and immersed in the fluidized bed in the combustion chamber for reheating the purified smoke gas coming from the purifying means to the temperature which the smoke gas had prior to its cooling and purifying;
   gas turbine located after and connected to the heat exchanger so as to receive the purified smoke gas reheated in the second heat exchanger immersed in the fluidized bed; and
   mixing means arranged to mix a not yet reheated smoke gas in a controllable quantity with the reheated smoke gas.

2. The apparatus for power and/or heat generation according to claim 1 further comprising
   a recuperator connected to the gas turbine.

3. The apparatus for power and/or heat generation according to claim 2 further comprising
   a stack connected to the recuperator for removing the waste gas.

4. The apparatus for power and/or heat generation according to claim 1 wherein
   the first heat exchanger is provided by a feed adding a member of the group consisting of compressed air, compressed waste gas, steam, compressed air from the compressor through a pipe connection, purified smoke gas coming from the purifying means through a pipe connection and assortments thereof.

5. The apparatus for power and/or heat generation according to claim 1 wherein the purifying means comprises an electrostatic purifier.

6. The apparatus for power and/or heat generation according to claim 1 wherein the purifying means comprises cyclone, granular bed filter, baffles, and/or scrubbers or preferably a bag house filter.

* * * * *